United States Patent
Horiguchi et al.

(10) Patent No.: US 9,588,410 B2
(45) Date of Patent: Mar. 7, 2017

(54) PROJECTION TYPE DISPLAY DEVICE AND CONTROL METHOD THEREOF

(75) Inventors: Hirosada Horiguchi, Minowa-machi (JP); Hiroshi Yoshimoto, Suwa (JP); Tadashi Yamada, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 815 days.

(21) Appl. No.: 13/588,970

(22) Filed: Aug. 17, 2012

(65) Prior Publication Data

US 2013/0044297 A1 Feb. 21, 2013

(30) Foreign Application Priority Data

Aug. 18, 2011 (JP) .................. 2011-178784
Aug. 6, 2012 (JP) .................. 2012-173907

(51) Int. Cl.
G03B 21/20 (2006.01)
H04N 9/31 (2006.01)
G02B 26/02 (2006.01)
G02B 27/10 (2006.01)

(52) U.S. Cl.
CPC ....... *G03B 21/2053* (2013.01); *G02B 26/023* (2013.01); *H04N 9/3155* (2013.01); *H04N 9/3182* (2013.01); *G02B 27/1026* (2013.01)

(58) Field of Classification Search
CPC ... G03B 21/14; G03B 21/2053; H04N 9/3133
USPC .......... 353/97, 31, 85, 84; 362/282
See application file for complete search history.

(56) References Cited

U.S. PATENT DOCUMENTS

| | | | |
|---|---|---|---|
| 7,438,420 B2 | 10/2008 | Harada et al. | |
| 7,748,854 B2* | 7/2010 | Sugino et al. | 353/97 |
| 2005/0068505 A1 | 3/2005 | Momose et al. | |
| 2008/0218703 A1 | 9/2008 | Shirasu et al. | |
| 2009/0091272 A1 | 4/2009 | Yamada et al. | |
| 2010/0073639 A1* | 3/2010 | Shibasaki | 353/31 |

FOREIGN PATENT DOCUMENTS

| | | |
|---|---|---|
| EP | 1 489 853 A2 | 12/2004 |
| EP | 1 767 987 A1 | 3/2007 |

(Continued)

OTHER PUBLICATIONS

European Search Report dated Aug. 29, 2013 in application No. 12180202.9.

*Primary Examiner* — Steven H Whitesell Gordon
*Assistant Examiner* — Jerry Brooks
(74) *Attorney, Agent, or Firm* — Maschoff Brennan (57) ABSTRACT

A projector which includes a light source, liquid crystal light valves, a dimming mechanism, an illumination optical system, a control circuit which determines an input light amount which is caused to be input to the liquid crystal light valve on the basis of an input image signal, outputs an output image signal which is decompressed according to the input light amount, and generates a first control signal which designates a first dimming rate of a high pressure mercury lamp and a second control signal which designates a second dimming rate of the dimming mechanism based on the input light amount, an illumination driving circuit which drives the light source on the basis of the first control signal, and a douser driving circuit which drives the douser on the basis of the second control signal.

9 Claims, 10 Drawing Sheets

(56) References Cited

FOREIGN PATENT DOCUMENTS

| | | |
|---|---|---|
| EP | 2 222 079 A1 | 8/2010 |
| JP | 05-066501 A | 3/1993 |
| JP | 2004-264819 A | 9/2004 |
| JP | 2007-212852 A | 8/2007 |
| JP | 2008-096805 A | 4/2008 |
| JP | 4158618 B2 | 7/2008 |
| JP | 2008-226550 A | 9/2008 |
| JP | 2009-93862 A | 4/2009 |
| JP | 2010-152373 A | 7/2010 |
| JP | 2010-217338 A | 9/2010 |
| JP | 2011-017792 A | 1/2011 |
| WO | 2012-063336 A1 | 5/2012 |

* cited by examiner

| A11 | A12 | A13 | ••• | ••• | A1n |
|-----|-----|-----|-----|-----|-----|
| A21 | ••• | ••• |     |     |     |
| A31 | ••• | ••• |     |     |     |
| ⋮ | ••• | ••• |     |     |     |
| ⋮ | ••• | ••• |     |     |     |
| Am1 | ••• | ••• |     |     | Amn |

FIG. 12

PROJECTION TYPE DISPLAY DEVICE AND CONTROL METHOD THEREOF

CROSS REFERENCES TO RELATED APPLICATIONS

The entire disclosure of Japanese Patent Application No. 2011-178784, filed Aug. 18, 2011 and Japanese Patent Application No. 2012-173907, filed Aug. 6, 2012 are expressly incorporated herein by reference.

BACKGROUND

1. Technical Field

The present invention relates to a projection type display device including lamp dimming and mechanical dimming, and a control method thereof

2. Related Art

In recent years, a projectors, which are a type of projection type display device which displays a display onto a large screen are widely used. The projectors are advantageous when a large screen is desired, however, there has been a problem in that it is difficult to obtain a sufficient contrast since a display contrast of the projector depends on a contrast in a liquid crystal light valve. Therefore, a technology has been known in which luminance of a light source is changed according to an image signal in order to adjust an input light amount to the liquid crystal light valve (for example, refer to Japanese Patent Application No. JP-A-5-66501). Further, a projector has also been developed in which a mechanical dimming unit is provided on an optical path from the light source to the liquid light valve (for example, refer to Japanese Patent No. 4158618). The mechanical dimming unit is a unit which opens and shuts a douser, and functions as a diaphragm.

Meanwhile, there is a configuration where a high pressure mercury lamp is used as the light source. When a state where a dimming rate is high is maintained for a long time in the high pressure mercury lamp, a function of a halogen cycle in a lamp declines, and a blackening phenomenon occurs in which evaporated electrode components are precipitated in an inner wall of the lamp. For this reason, there is a problem in that the dimming rate has a certain limit when performing the dimming of the lamp, and it is difficult to sufficiently raise the contrast. Further, there is a problem in that, if the light amount is decreased, an emission spectrum changes, and a color shift occurs, when performing dimming of the lamp.

On the other hand, there is a problem in that an employed material, or a structure of the douser is limited, and it is difficult to reduce the power consumption of the light source, since a load of heat of the douser is large in the mechanical dimming. Further, there is a problem in the mechanical dimming that color unevenness occurs, since a component of oblique light which is input to the liquid crystal light valve changes, when the dimming rate is changed.

SUMMARY

An advantage of some aspects of the invention is to provide a projection type display device in which lamp dimming and mechanical dimming are improved.

According to an aspect of the invention, there is provided a projection type display device which includes a light source which includes a high pressure mercury lamp, a liquid crystal light valve which performs an optical modulation with respect to input light, a dimming unit which is provided between the light source and the liquid crystal light valve and which mechanically shields light from the light source, a projection unit which projects light from the liquid crystal light valve, a control unit which determines an input light amount which is caused to be input to the liquid crystal light valve on the basis of an input image signal which shows an image to be displayed, outputs an output image signal which is the decompressed input image signal according to the input light amount to the liquid crystal light valve, and determines a first dimming rate as a dimming rate of the high pressure mercury lamp and a second dimming rate as a dimming rate of the dimming unit; a light source driving unit which drives the light source on the basis of the first dimming rate, and a dimming driving unit which drives the dimming unit on the basis of the second dimming rate.

According to an aspect of the invention, since the second dimming rate of the mechanical dimming can be decreased by combining the lamp dimming and the mechanical dimming, it is possible to relieve a heat load of the dimming unit, to widen flexibility of use materials thereof, and to simplify the structure. In addition, since it is possible to assign a system dimming rate which is obtained by combining the lamp dimming and the mechanical dimming to the lamp dimming, as well, the power consumption of the light source can be reduced, and a variation range of the second dimming rate of the mechanical dimming can be narrowed. Accordingly, it is possible to suppress an irregularity of an image.

According to another aspect of the invention, there is provided a method of controlling a projection type display device including a light source which includes a high pressure mercury lamp, a liquid crystal light valve which performs an optical modulation with respect to input light, a dimming unit which is provided between the light source and the liquid crystal light valve and which mechanically shields light from the light source, and a projection unit which projects light from the liquid crystal light valve.

The method of controlling the projection type display device includes determining an input light amount which is caused to be input to the liquid crystal light valve on the basis of an input image signal which shows an image to be displayed, supplying an output image signal which is the decompressed input image signal according to a determined light amount to the liquid crystal light valve, determining a first dimming rate as a dimming rate of the high pressure mercury lamp and a second dimming rate as a dimming rate of the dimming unit, drives the light source on the basis of the first dimming rate, and driving the dimming unit on the basis of the second dimming rate.

Another aspect of the invention is a projection type display device including a light source, an optical modulation unit which performs optical modulation with respect to input light, a dimming unit which is provided between the light source and the optical modulation unit and which mechanically shields light from the light source, a projection unit which projects light from the optical modulation unit, a control unit which determines an input light amount which is caused to be input to the optical modulation unit on the basis of an input image signal which shows an image to be displayed, supplies an output image signal which is a decompressed input image signal according to the input light amount to the optical modulation unit, and determines a first dimming rate as a dimming rate of the light source, and a second dimming rate as a dimming rate of the dimming unit, a light source driving unit which drives the light source on the basis of the first dimming rate, and a dimming driving unit which drives the dimming unit on the basis of the second dimming rate.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
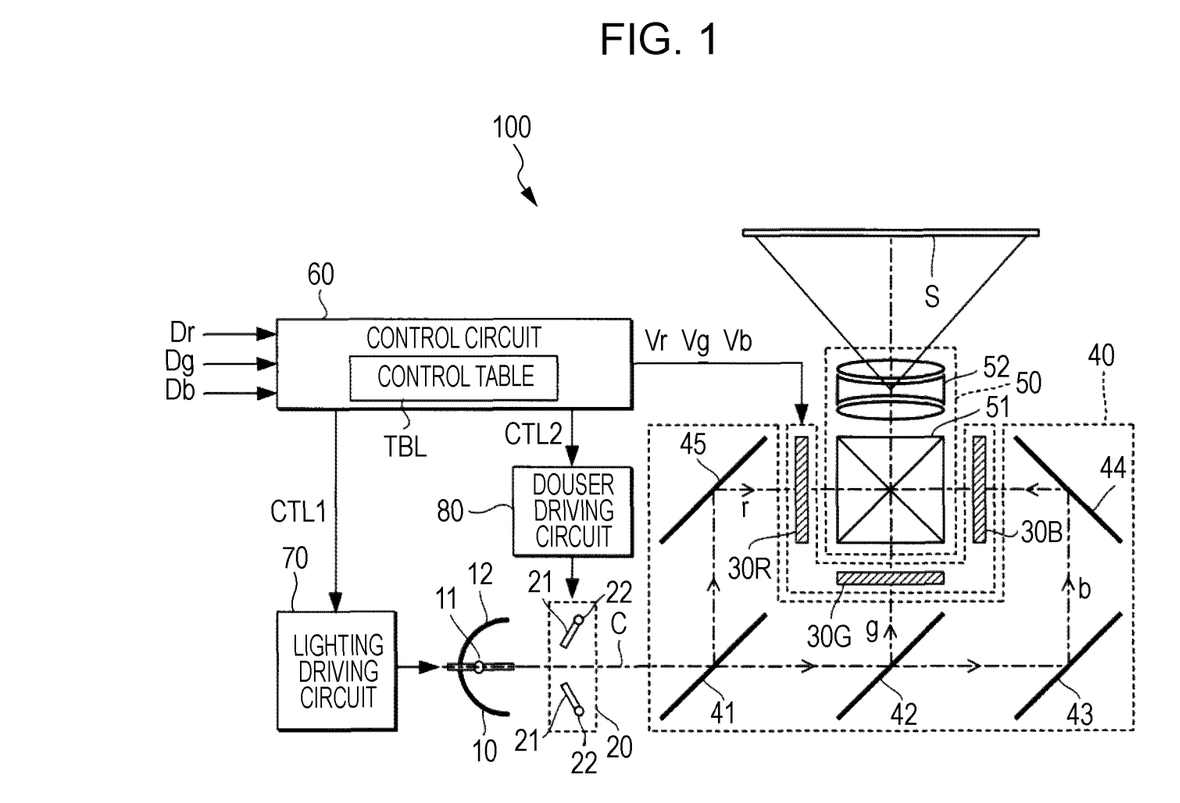
FIG. 1 is a block diagram which shows a projector according to a first embodiment of the invention.

FIG. 1 is a block diagram which shows a configuration of a projector 100 according to a first embodiment of the invention.

First, a mechanical configuration of the projector 100 will be described. The projector 100 includes a light source 10 which emits white light, a mechanical dimming mechanism 20 which performs dimming with respect to light from the light source 10 by moving a douser, liquid crystal light valves 30R, 30G, and 30B corresponding to a red color (R color), a green color (G color), and a blue color (B color), respectively, an illumination optical system 40 which guides light which is emitted from the dimming mechanism 20 to the liquid crystal light valves 30R, 30G, and 30B, and a projection optical system 50 which composes light transmitted the liquid crystal light valves 30R, 30G, and 30B, and projects the composed light onto a screen S.

The light source 10 includes a lamp 11 such as a high pressure mercury lamp, and a reflector 12 which reflects light of the lamp 11. The dimming mechanism 20 includes a pair of dousers 21 which are arranged axial symmetrically with respect to a system optical axis C, a pair of rotational axes 22 which are extended in a direction parallel to the surface of the douser 21, and a stepping motor (not shown) which is provided in a revolving axis 22. The douser 21 is rotated by a rotation of the revolving axis 22.

The illumination optical system 40 includes dichroic mirrors 41 and 42, and reflecting mirrors 43, 44, and 45. Each color light which is subject to a spectral analysis by the illumination optical system 40 is guided to the liquid crystal light valves 30R, 30G, and 30B.

The white light which is emitted from the dimming mechanism 20 is input to the dichroic mirror 41, red light beam r in the white light is reflected, and blue light beam b and green light beam g are transmitted. The red light beam r which is reflected on the dichroic mirror 41 is reflected on the reflecting mirror 45, inputs to the liquid crystal light valve 30R, is optically modulated by the liquid crystal light valve 30R, and is input to a cross dichroic prism 51. On the other hand, the light beams which transmit the dichroic mirror 41 are input to the dichroic mirror 42, the green light beam g is reflected by the dichroic mirror 42, is input to the liquid crystal light valve 30G, is optically modulated by the liquid crystal light valve 30G, and is input to the cross dichroic prism 51. On the other hand, the blue light beam b which transmits the dichroic mirror 42 is reflected on the reflecting mirrors 43 and 44, is input to the liquid crystal light valve 30B, is optically modulated by the liquid crystal light valve 30B, and is input to the cross dichroic prism 51.

A plurality of scanning lines, a plurality of data lines, and a plurality of pixels are formed in the liquid crystal light valve 30R, 30G, and 30B, in which the plurality of pixels are formed corresponding to intersections of the scanning lines and the data lines. Each of the plurality of pixels includes a pixel electrode, a thin film transistor which is provided between the data line and the pixel electrode by being subject to an on-off control according to the scanning signal which is supplied through the scanning line, a counter electrode which faces the pixel electrode, and liquid crystal which is interposed between the pixel electrode and the counter electrode. In addition, the liquid crystal light valve 30R, 30G, and 30B further includes a scanning line driving circuit which supplies a scanning signal which becomes active sequentially to the plurality of scanning lines, and a data line driving circuit which supplies a line-sequence data signal which is transformed from a point-sequence image data with a level corresponding to a gradation to be displayed to the plurality of data lines. The thin film transistor of each pixel supplies a data signal which is turned on and supplied through the data line to the pixel electrode when the scanning signal becomes active. The counter electrode is supplied with a constant potential. In this manner, the liquid crystal is applied with a voltage corresponding to a gradation to be displayed, and transmittivity thereof is controlled.

The projection optical system 50 includes the cross dichroic prism 51, and a projector lens 52. Four right angle prisms are adhered to the cross dichroic prism 51, and a dielectric multilayer film which reflects the red light, and a dielectric multilayer film which reflects the blue light are formed in a cross shape on the inner surface of the cross dichroic prism. Three color light beams which are input to the cross dichroic prism 51 are composed here, and form light which displays a color image. The composed light is projected onto the screen S by the projecting lens 52, thereby displaying an enlarged image.

Subsequently, an electrical configuration of the projector 100 will be described. The projector 100 includes a control circuit 60 which functions as the control center, an illumination driving circuit 70 which drives the light source 10 on the basis of a first control signal CTL 1, and a douser driving circuit 80 which drives the dimming mechanism 20 on the basis of a second control signal CTL 2.

The control circuit 60 is supplied with an input image signal Dr displaying a red image, an input image signal Dg displaying a green image, and an input image signal Db displaying a blue image. The control circuit 60 determines the brightness control signal on the basis of these input image signals Dr, Dg, and Db.

The control circuit 60 determines an input light amount (equivalent to an input light amount which is input to each liquid crystal light valve) which is input to the illumination optical system 40 on the basis of the brightness control signal, and decompresses the input image signals Dr, Dg, and Db in an appropriate gradation range.

The decompressed image signals are supplied to each of the liquid crystal light valves 30R, 30G, and 30B, as output image signals Vr, Vg, and Vb after being converted to analog signals by a DA converter. In addition, the control circuit 60 supplies a control signal for driving the scanning line driving circuit and the data line driving circuit which are provided at the liquid crystal light valves 30R, 30G, and 30B to the liquid crystal light valves 30R, 30G, and 30B.

Here, as a method of controlling the projector 100, (2) a control using a projection amplification, (3) an external or user control, or the like, in addition to (1) a control adaptive to display image are considered. Hereinafter, the respective method will be described.

1. Control Adaptive to Display Image

First, a control which is adaptive to a display image, that is, a case in which a brightness control adaptive to a display image is performed so that a light amount becomes large in a bright video scene, and the light amount becomes small in a dark video scene. In this case, as described above, the brightness control signal is determined on the basis of the input image signals Dr, Dg, and Db in the control circuit 60, and for the method, for example, following three methods are considered.

a. A method in which a gradation number with the maximum brightness among pixel data items which are included in a frame is set to the brightness control signal.

Figure 9A:
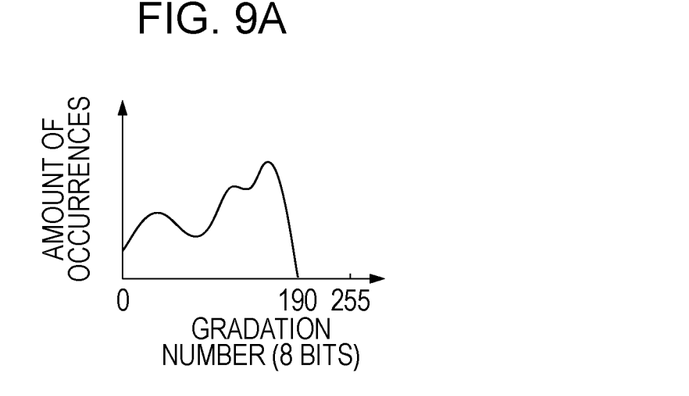
FIGS. 9A and 9B are explanatory diagrams which describe occurrence distribution (histogram) for each gradation number of image data.

In this example, an image signal with gradation numbers of 256 steps of 0 to 255 is assumed. When considering an arbitrary single frame configuring a continuous video, occurrence distribution (histogram) for each gradation number of the pixel data included in the frame is shown as in FIG. 9A. In the figure, since the gradation number with the brightest brightness included in the histogram is 190, the gradation number 190 is set to the brightness control signal. This method can express the most faithful brightness with respect to the input image signals Dr, Dg, and Db.

b. A method in which a gradation number of a certain ratio (for example, 10%) with respect to occurrences from the maximum brightness is set to the brightness control signal from occurrence distribution (histogram) for each gradation number included in a particular frame.

Figure 10:
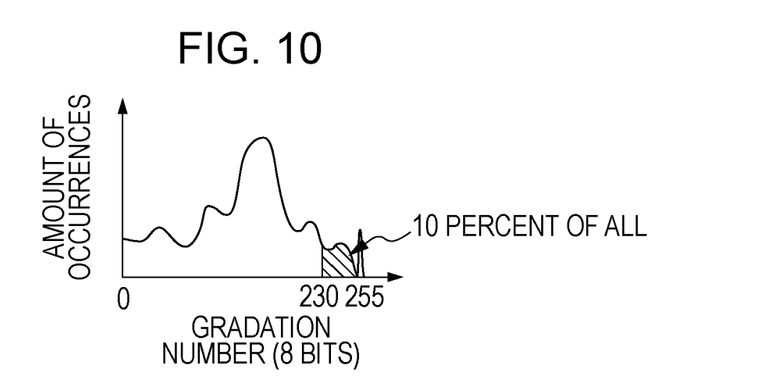
FIG. 10 is an explanatory diagram which describes the occurrence distribution of a video signal.

For example, when the occurrence distribution of an image signal is shown as in FIG. 10, an area of 10% from the bright side is taken from the histogram. When it is assumed that the gradation number of the area of 10% is 230, the gradation number 230 is set to the brightness control signal. As the histogram shown in FIG. 10, when there is a sudden peak in the vicinity of the gradation number 255, the gradation number 255 is set to the brightness control signal when the above described method (a) is adopted. However, the portion of the sudden peak is almost meaningless as information in the entire screen. In contrast to this, the present method in which the gradation number 230 is set to the brightness control signal can be understood as a method in which the brightness control signal is determined by a meaningful area as the information in the entire screen. In addition, the above ratio may be changed in a range of approximately 2 to 50%.

c. A method in which a screen is divided into a plurality of blocks, a mean value of gradation numbers of included pixels is obtained for each block, and the maximum value is set to the brightness control signal.

Figure 11:
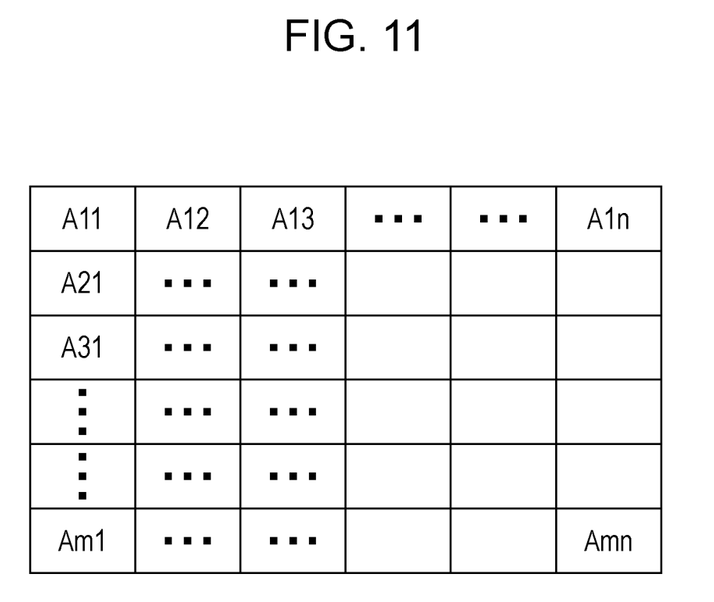
FIG. 11 is an explanatory diagram which describes a screen which is divided into a plurality of blocks.

For example, as shown in FIG. 11, the screen is divided into m×n blocks, a mean value of the brightness of each block A11 to Amn (gradation number) is calculated, and the maximum value thereof is set to the brightness control signal. In addition, it is preferable to set the divided number of screen to approximately 6 to 200. This method is a method in which the brightness can be controlled without damaging an atmosphere of the entire screen.

Regarding the above described methods (a) to (c), it is also possible to apply the methods only at a specified portion, for example, the center portion of the display area, in addition to the method in which the determination of the brightness control signal is performed with respect to the entire display area. In this case, it is possible to perform a control such that the brightness is determined from a portion to which a viewer pays attention.

Subsequently, in the control circuit 60, an input light amount which is input to the illumination optical system 40 is determined on the basis of the brightness control signal which is determined using the above described method, a dimming rate of the light source 10 (hereinafter, referred to as a first dimming rate), and the dimming rate of the dimming mechanism 20 (hereinafter, referred to as a second dimming rate) are determined so that the input light amount is obtained, and the light source 10 and the dimming mechanism 20 are controlled on the basis of the first and second dimming rates. For this method, for example, following three methods are considered, as well.

a. A method of controlling in real time according to output brightness control signal.

This method is ideal in that the method is completely faithful to the brightness of a video. However, there may be a case where the brightness or darkness of the screen is changed in a short period depending on contents of the video, and as such, there is a concern that a problem may occur in which an unnecessary stress is felt when viewing the video.

b. A method in which an output brightness control signal is applied with an LPF (Low Pass Filter), and is controlled by an output thereof.

For example, a change in the brightness control signal of 1 to 30 secs or less is cut by the LPF, and a control is performed using the output. According to the method, it is possible to suppress the change in the brightness or darkness in a short period, since the change in a short time as above is cut.

c. A method in which a switching edge of a brightness control signal is detected.

The light source 10 and the dimming mechanism 20 are controlled only when there is a change of a predetermined magnitude or more (for example, sixty gradations or more) in the brightness control signal. With this method, a control according to only the switching of the scene can be performed.

In this manner, when gradation number 190 is set to the brightness control signal, for example, if the light amount of the maximum brightness (gradation number 255) is set to 100%, the input light amount which is input to the illumination optical system 40 becomes 75% (190/255=75%), and the control circuit 60 drives the light source 10 and the dimming mechanism 20 so that the input light amount input to the illumination optical system 40 becomes 75%.

According to the embodiment, since the light source 10 is a high pressure mercury lamp 11, and the dimming mechanism 20 is a douser 21, a voltage value which drives the high pressure mercury lamp 11, and a rotation angle of the douser 21 are controlled so that the transmittivity becomes 75% (shading rate 25%).

Similarly, when the gradation number 230 is the brightness control signal, the light source 10 and the dimming mechanism 20 are controlled so that the input light amount of 230/255=90% is obtained.

Figure 9B:
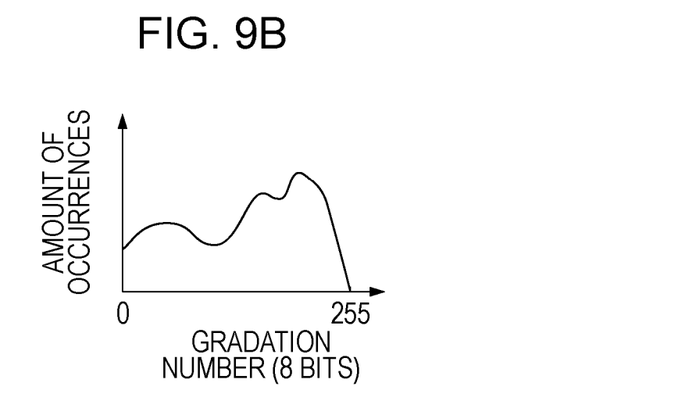

On the other hand, in the control circuit 60, a video signal is decompressed up to an appropriate gradation range on the basis of the brightness control signal and the video signal which are determined in the control circuit 60. For example, when the video signal is decompressed up to the maximum gradation range, since the maximum gradation number to be displayed is 255 in the above example, if the brightness control signal is the gradation number 190 in the example shown in FIG. 9A, the video signal of which the gradation numbers are 0 to 190 is decompressed up to the gradation numbers 0 to 255 as shown in FIG. 9B. Due to such a control of an illumination light amount, and decompressing processing of the video signal, it is possible to express smooth gradation while extending a dynamic range of video.

2. Control by Projection Amplification

A control is performed corresponding to zooming of a projection lens 52. In general, since a light amount per unit area in the liquid crystal light valve (lighted area) is constant, a screen on the enlarging side becomes dark, and a screen on the contracting side becomes bright. Accordingly, in order to correct this, the light source 10 and the dimming mechanism 20 are controlled so that the light amount is increased when a change is performed on the enlarging side, and the light amount is decreased when a change is performed on the contracting side.

3. User Control

The light source 10 and the dimming mechanism 20 are controlled according to a preference of a user. For example, the light source 10 and the dimming mechanism 20 are controlled so that the light amount is decreased in a dark appreciation environment, and the light amount is increased in a bright appreciation environment. In this case, it may be configured such that a user performs adjusting using a controller, by directly operating the light source 10 and the dimming mechanism 20, or the like, or may be configured so as to be automatically controlled by providing a brightness sensor.

Subsequently, controls of the light source 10 and the dimming mechanism 20 will be described.

A contrast ratio of the projector 100 is determined by a ratio of the maximum transmittivity to the minimum transmittivity in the liquid crystal light valve 30R, 30G, and 30B, and a ratio of the maximum dimming rate of the light source 10 to the maximum dimming rate of the dimming mechanism 20. For example, when the maximum transmittivity of the liquid crystal light valve is 98%, and the minimum transmittivity thereof is 0.245%, the contrast ratio of the liquid crystal light valve itself is 400:1. In this case, if a system dimming rate in which the light source 10 and the dimming mechanism 20 are combined is 95%, the contrast ratio can be raised to 8000:1.

The control circuit 60 determines the input light amount which is input to the illumination optical system 40 on the basis of the brightness control signal based on the input image signals Dr, Dg, and Db, and determines the first dimming rate of the light source 10, and the second dimming rate of the dimming mechanism 20 so that the input light amount is obtained.

Figure 2:
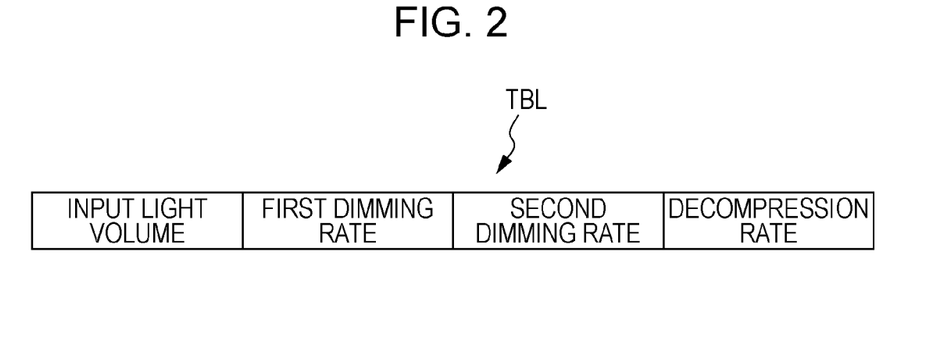
FIG. 2 is an explanatory diagram which describes stored contents of a control table.

Specifically, the control circuit 60 includes a control table TBL which is configured by a non-volatile memory, and determines the first dimming rate and the second dimming rate by referring to the control table TBL. FIG. 2 shows stored contents of the control table TBL. In the control table TBL, the first and second dimming rates, and a decompression rate are stored by being correlated with the input light amount. Accordingly, when the input light amount is determined, it is possible to specify the first and second dimming rates, and the decompression rate by referring to the control table TBL.

In this manner, for example, when the gradation number 190 is determined as the brightness control signal, if the light amount of the maximum brightness (gradation number 255) is set to 100%, the input light amount to be input to the illumination optical system 40 becomes 75% (190/255=75%). In addition, the control circuit 60 specifies the dimming rate of the light source 10 to 63%, and the dimming rate of the dimming mechanism 20 to 32% so that the input light amount to be input to the illumination optical system 40 becomes 75% by referring to the control table TBL. In addition, the control circuit specifies the decompression rate to 128% so that the video signal with the gradation numbers 0 to 190 is decompressed to the gradation numbers 0 to 255.

The control circuit 60 generates the output image signals Vr, Vg, and Vb which are the decompressed input image signals Dr, Dg, and Db, according to the specified decompression rate. In addition, the control circuit 60 generates a first control signal CTL 1 according to the specified first dimming rate. Since the illumination driving circuit 70 drives the high pressure mercury lamp 11 with a voltage value based on the first control signal CTL 1, the dimming rate of the light source 10 becomes the first dimming rate. In addition, the dimming rate of the light source 10 becomes "1-Lx/Lmax" when the maximum light amount to be emitted by the light source 10 is set to Lmax, and the current light amount is set to Lx. In addition, the control circuit 60 generates a second control signal CTL 2 according to the specified second dimming rate. The douser driving circuit 80 adjusts an angle of the douser 21 of the dimming mechanism 20 on the basis of the second control signal CTL 2. In this manner, the dimming rate of the dimming mechanism 20 is adjusted to the second dimming rate. In addition, the dimming rate of the dimming mechanism 20 becomes "1-Lout/Lin" when the light amount of light input to the dimming mechanism 20 is set to Lin, and the light amount of light input to the dimming mechanism 20 is set to Lout.

Here, the diming by the light source 10 based on the first dimming rate is referred to as the lamp dimming, the diming by the dimming mechanism 20 based on the second dimming rate is referred to as the mechanical dimming, and the entire system dimming rate in which the lamp dimming and the mechanical dimming are combined is referred to as the system dimming. The system dimming rate becomes the product of the first dimming rate of the lamp dimming and the second dimming rate of the mechanical dimming. These relationships become the following expression:

system dimming rate [%]=100%−(100%−dimming rate of lamp dimming [%])×(100%−dimming rate of mechanical dimming [%])

Figure 3:
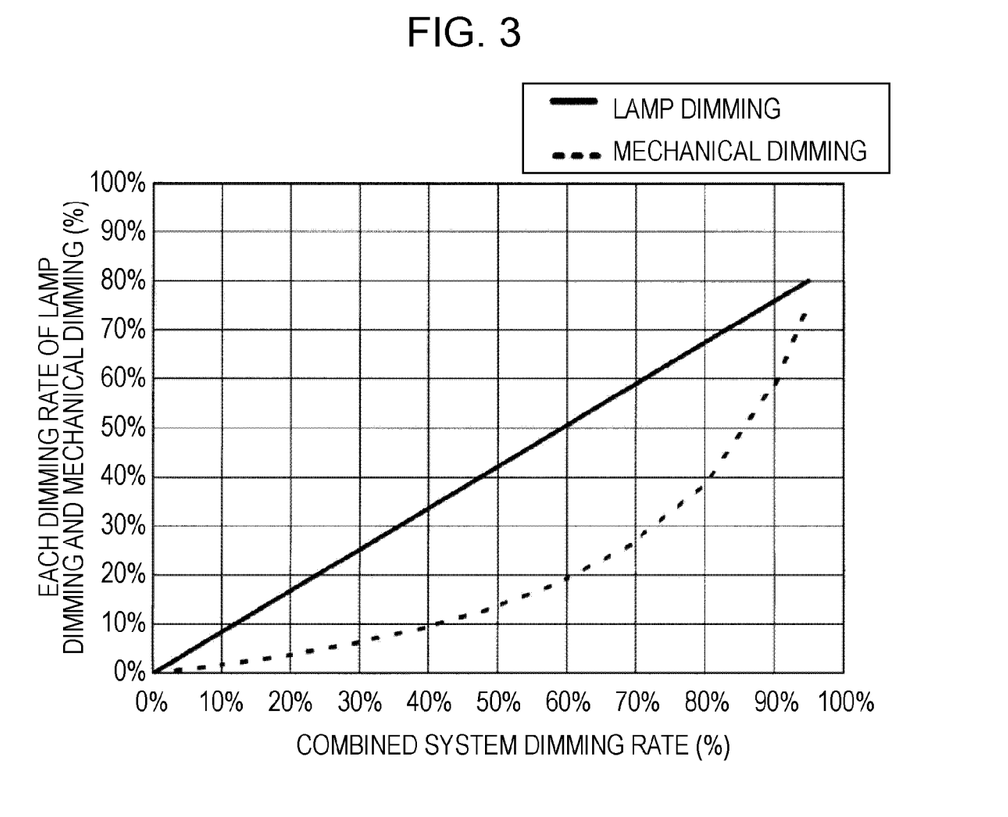
FIG. 3 is a graph which shows a relationship between dimming rates of lamp dimming and mechanical dimming and a system dimming rate of the projector according to the first embodiment of the invention.

For example, as described above, when the dimming rate of the light source 10 is set to 63%, and the dimming rate of the dimming mechanism 20 is set to 32% so that the input light amount to be input to the lighting optical system 40 becomes 75%, the combined system dimming rate becomes 75% (refer to FIG. 3). In this manner, as shown in FIG. 3, the control circuit 60 respectively sets the dimming rates of the lamp dimming and the mechanical dimming in order to obtain the combined system dimming rate which is necessary, according to the input light amount to be input to the illumination optical system 40.

In this example, the first dimming rate of the lamp dimming is linearly increased accompanying the increase in system dimming rate, and the maximum value becomes 80%. The maximum value of the first dimming rate is set to the maximum dimming rate as the maximum dimming rate in the high pressure mercury lamp which is adjustable. When the system dimming rate is 0%, the input light amount of light which is input to the liquid crystal light valve becomes the maximum light amount. Accordingly, the control circuit 60 controls the first dimming rate of the lamp dimming to be the maximum dimming rate when the system dimming rate is 95% as the maximum by causing the first dimming rate to be monotonously increased as the input light amount is decreased from the maximum light amount, and causes the second dimming rate of the mechanical dimming to be increased so as to supplement the system dimming rate as necessary.

In this manner, since the second dimming rate of the mechanical dimming can be decreased by combining the lamp dimming and the mechanical dimming, it is possible to relieve the heat load of the douser 21, to widen flexibility of the use materials, and to simplify the structure. Further, since it is possible to assign the system dimming rate to the lamp dimming, as well, the power consumption of the light source 10 can be reduced. In addition, since it is possible to narrow the variation range of the second dimming rate of the mechanical dimming, the occurrence of color unevenness can be suppressed.

In addition, in order to relieve the heat load of the douser 21 while reducing the power consumption, the first dimming rate of the lamp dimming is controlled so as to exceed the second dimming rate of the mechanical dimming.

2. Second Embodiment

A projector 100 according to a second embodiment has the same configuration as that of the projector 100 according to the first embodiment shown in FIG. 1, except that the stored contents in the control table TBL are varied.

Figure 4:
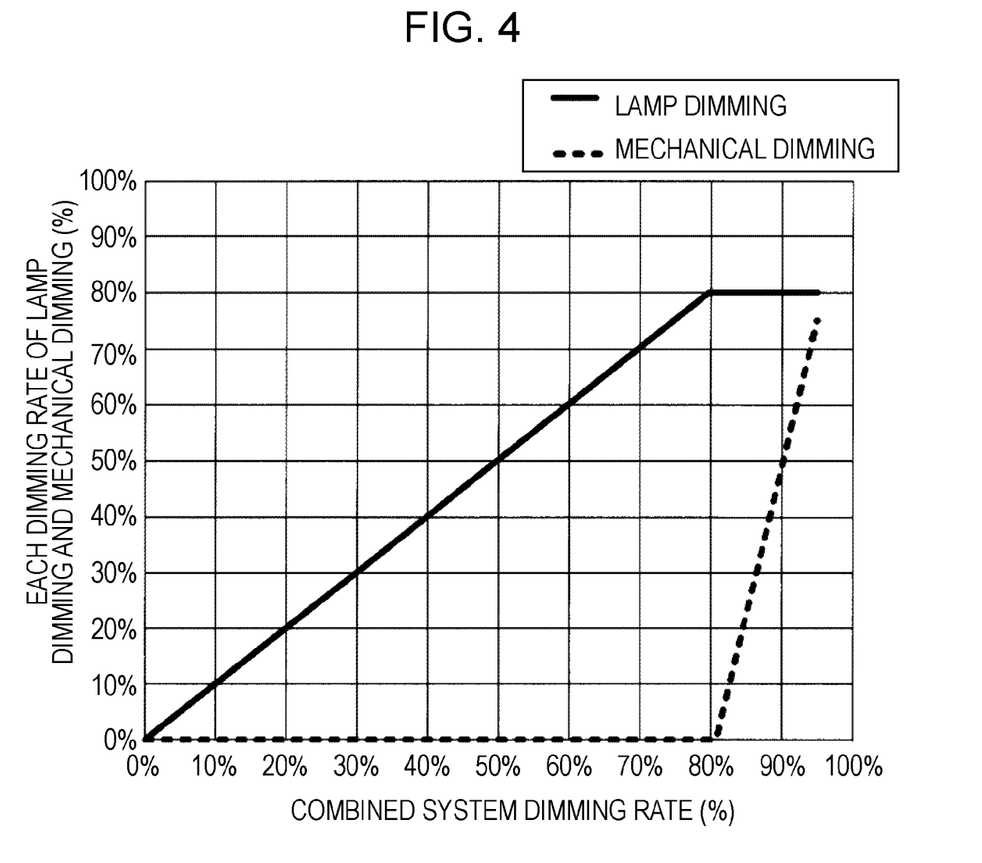
FIG. 4 is a graph which shows a relationship between dimming rates of lamp dimming and mechanical dimming and a system dimming rate of the projector according to a second embodiment of the invention.

FIG. 4 shows a relationship between the dimming rates of the lamp dimming and the mechanical dimming and the system dimming rate which are executed in a control circuit of the second embodiment.

In the example, in a range where a desired system dimming rate can be obtained by adjusting the lamp dimming, only the lamp dimming is performed, and in a range where the system dimming rate cannot be obtained only by the lamp dimming, the mechanical dimming is performed together.

As described above, the maximum dimming rate of the lamp dimming is 80%. The control circuit 60 increases the first dimming rate by setting the second dimming rate of the mechanical dimming to zero until the first dimming rate of the lamp dimming reaches 80% as the input light amount is decreased from the maximum light amount. In addition, the control circuit 60 controls the system dimming rate to be changed in a range of 0% to 95% by increasing the second dimming rate of the mechanical dimming after the first dimming rate of the lamp dimming reaches 80% (maximum dimming rate).

Since it is possible to perform dimming up to a level which cannot be dimmed using the lamp dimming by performing such a control, it is possible to raise the contrast ratio, and to display an image with a wide dynamic range. In addition, since the second dimming rate of the mechanical dimming can be decreased, it is possible to relieve the heat load of the douser 21, to widen flexibility of the use materials, and to simplify the structure. Further, since it is possible to assign the system dimming rate to the lamp dimming, the power consumption of the light source 10 can be reduced. In addition, since it is possible to reduce the dimming by the douser of the mechanical dimming, it is possible to reduce the component of light in the oblique direction which is input to the liquid crystal light valve, and to improve the color unevenness.

3. Third Embodiment

A projector 100 according to a third embodiment has the same configuration as that of the projector 100 according to the first embodiment shown in FIG. 1, except that the stored contents in the control table TBL are varied.

Figure 5:
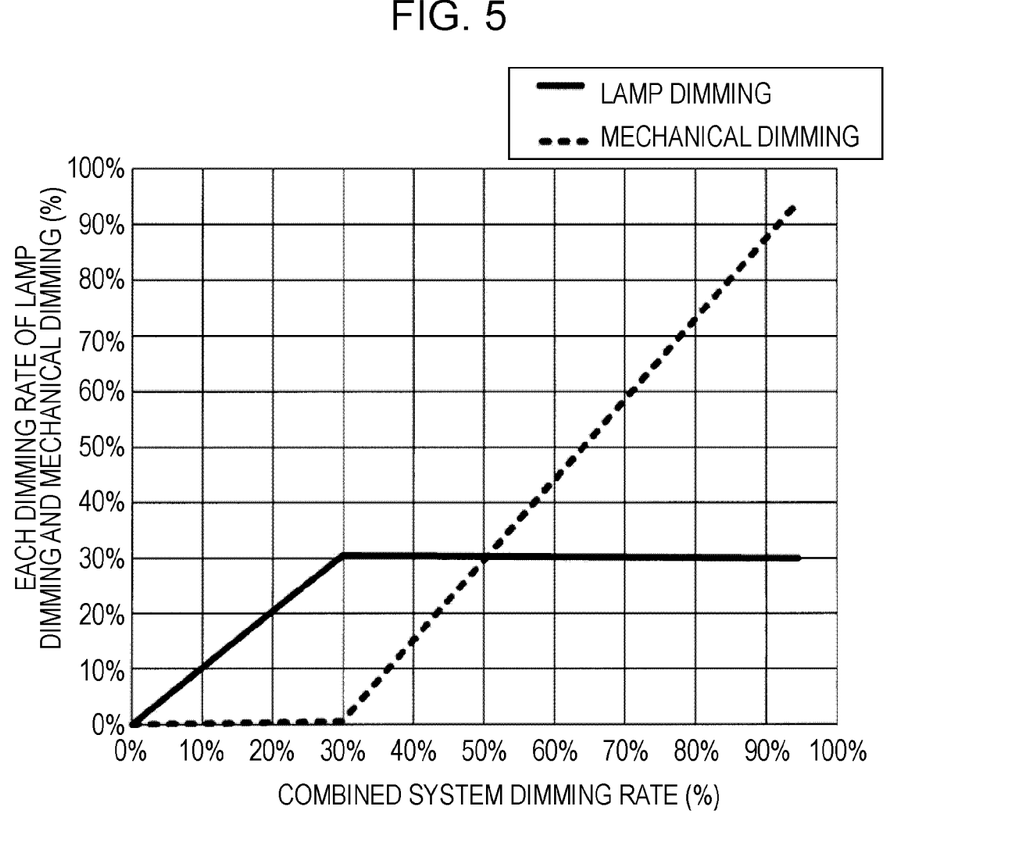
FIG. 5 is a graph which shows a relationship between dimming rates of lamp dimming and mechanical dimming and a system dimming rate of the projector according to a third embodiment of the invention.

In the example, in a range where a halogen cycle of a high pressure mercury lamp 11 normally functions in order to obtain a desired system dimming rate, only lamp dimming is performed, and in a range where the halogen cycle is abnormal, mechanical dimming is performed together.

In electrodes of the high pressure mercury lamp 11, electrodes using tungsten are generally used, and the tungsten sublimates when it becomes a high temperature. In the high pressure mercury lamp 11, the tungsten which is sublimated, and is precipitated into glass combines with the halogen vaporized in the lamp, and forms halogenations tungsten. This material is disintegrated in the vicinity of the electrode tip of high temperature, and the tungsten returns to the electrode. This series of chemical changes is referred to as the halogen cycle. Since the wear of the electrode due to evaporation of tungsten is suppressed by this reaction, a long life of the electrode can be obtained. However, when the dimming rate of the high pressure mercury lamp 11 is set to be high, the pressure of mercury is decreased, a part of the mercury becomes liquid, and the halogen is taken therein. Accordingly, the amount of halogen is reduced, and the halogen cycle does not function normally. As a result, the tungsten is precipitated to the inner wall of the high pressure mercury lamp 11. This causes the blackening phenomenon in which the high pressure mercury lamp becomes dark.

When the maximum dimming rate in which the halogen cycle normally functions in the high pressure mercury lamp 11 is set to a first reference dimming rate, the first reference dimming rate becomes 30% in this example.

FIG. 5 shows a relationship between the rates of lamp dimming and mechanical dimming which are performed in the control circuit according to the third embodiment and the system dimming rate. As shown in the figure, the control circuit 60 increases the first dimming rate by setting the second dimming rate of the mechanical dimming to zero until the first dimming rate of the lamp dimming reaches 30% as the first reference dimming rate, as the input light amount is decreased from the maximum light amount. In addition, the control circuit controls the system dimming rate to be changed in a range of 0% to 95% by increasing the second dimming rate of the mechanical dimming after the first dimming rate of the lamp dimming reaches 30% (first reference dimming rate).

By performing such a control, it is possible to supplement the shortage in the lamp dimming from the mechanical dimming in order to obtain a desired system dimming rate while causing the halogen cycle of the high pressure mercury lamp 11 to function normally. As a result, it is possible to raise the contrast ratio while obtaining a long life of the high pressure mercury lamp 11. In addition, since the second dimming rate of the mechanical dimming can be decreased, it is possible to reduce the heat load of the douser 21, to widen flexibility of the use materials thereof, and to simplify the structure. In addition, since it is possible to assign the system dimming rate to the lamp dimming, the power consumption of the light source 10 can be reduced.

4. Fourth Embodiment

A projector 100 according to a fourth embodiment has the same configuration as that of the projector 100 according to the first embodiment shown in FIG. 1, except that the stored contents in the control table TBL are varied.

In this example, only lamp dimming is performed until a color shift of a projected image reaches a permission level in order to obtain a desired system dimming rate, and mechanical dimming is performed together in a range where the color shift exceeds the permission level.

Figure 6:
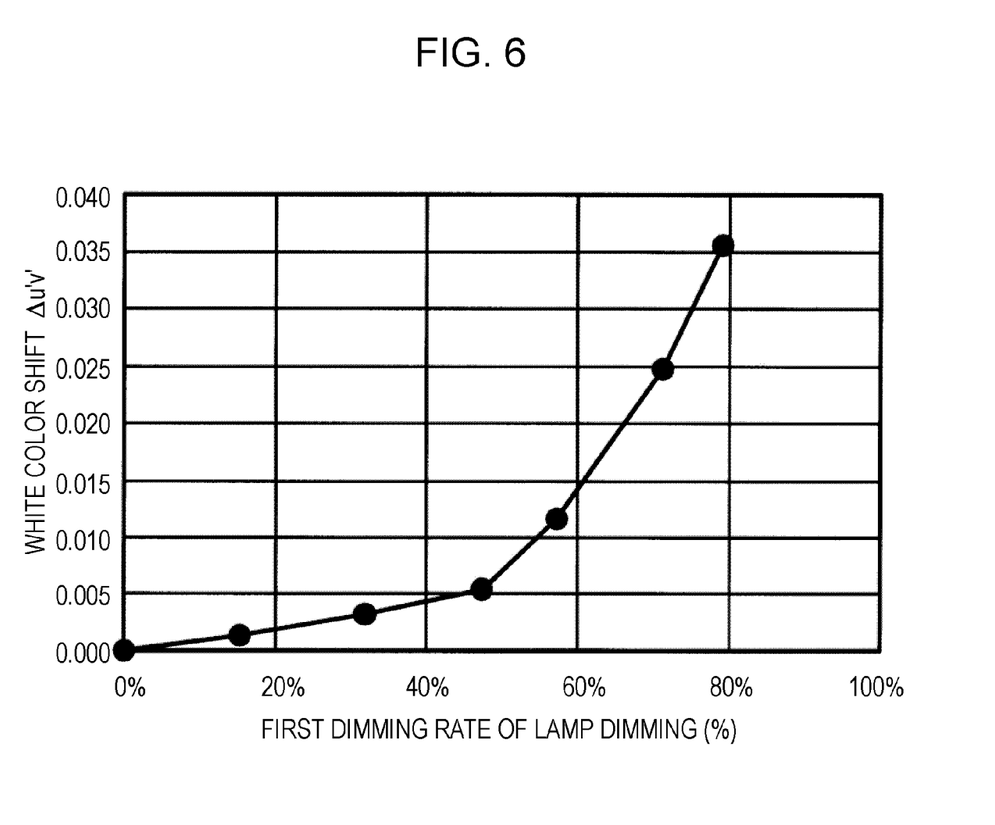
FIG. 6 is a graph which shows a relationship among a color shift, the lamp dimming, and the first dimming rate.

In the high pressure mercury lamp 11, emission spectrum is changed according to the emission luminance. Accordingly, when the first dimming rate is sequentially increased by the lamp dimming, color which is projected on the screen S is shifted compared to a case where the first dimming rate is zero. FIG. 6 shows a relationship between a color shift of white Δu', v' on a CIE u', v' chromaticity diagram and the first dimming rate of the lamp dimming. As shown in the figure, the larger the first dimming rate, the larger the color shift Δu', v'. In this example, a permission value (a predetermined reference) as a limit in which the color shift is permitted by a human vision is "0.010", and a second reference diming rate as a dimming rate corresponding to this is 54%. In addition, the permission value is appropriately determined by usage of the projector 100.

Figure 7:
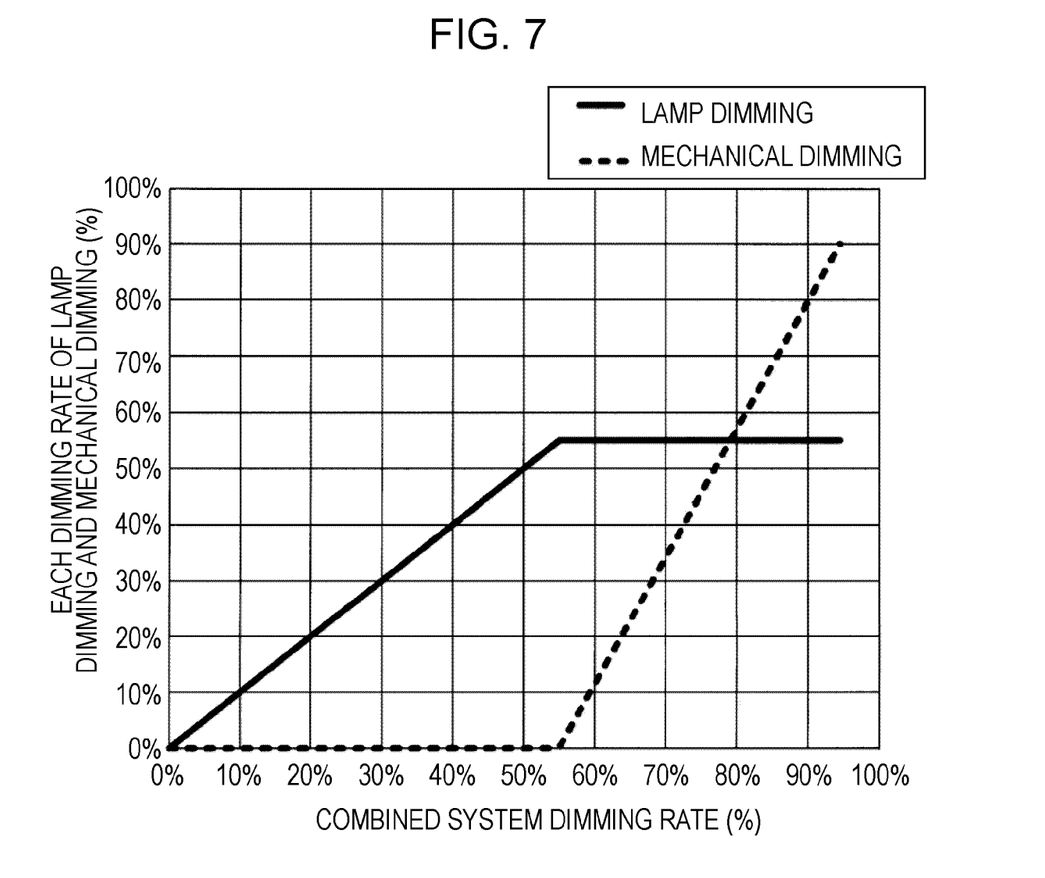
FIG. 7 is a graph which shows a relationship between dimming rates of lamp dimming and mechanical dimming and a system dimming rate of the projector according to a fourth embodiment of the invention.

FIG. 7 shows a relationship between the dimming rates of the lamp dimming and the mechanical dimming and the system dimming rate which are executed in the control circuit of the fourth embodiment. As shown in the figure, the control circuit 60 increases the first dimming rate by setting the second dimming rate of the mechanical dimming to zero until the first dimming rate of the lamp dimming reaches 54% as the second reference dimming rate as the input light amount is decreased from the maximum light amount. In addition, the control circuit controls the system dimming rate to be changed in a range of 0% to 95% by increasing the second dimming rate of the mechanical dimming after the first dimming rate of the lamp dimming reaches 54% (second reference dimming rate).

By performing such a control, it is possible to reduce the power consumption of the light source 10 in a range where the color shift is permitted, and to supplement the shortage in the lamp dimming from the mechanical dimming in order to obtain a desired system dimming rate. As a result, it is possible to raise the contrast ratio. In addition, since the second dimming rate of the mechanical dimming can be decreased, it is possible to reduce the heat load of the douser 21, to widen flexibility of the use materials thereof, and to simplify the structure.

5. Fifth Embodiment

In the projectors 100 according to the first, second, and fourth embodiment, dimming of the entire system is executed by combining the lamp dimming and the mechanical dimming. In contrast to this, a projector according to a fifth embodiment is different from the projectors 100 according to the first, second, and fourth embodiment in a point that in which dimming is performed using only the mechanical dimming when a predetermined condition is satisfied, and the same dimming operation as those of the first, second, and fourth embodiment is performed when a predetermined condition is not satisfied.

As described in the third embodiment, when the high dimming rate of the lamp dimming is continued for a long time, the function of the halogen cycle in the high pressure mercury lamp 11 is declined, and a phenomenon occurs in which evaporated electrode components are precipitated in the inner wall of the lamp, and the lamp is deteriorated. In order to prevent such a defect, in a case where the high first dimming rate is continued for a long time, it is necessary to drive the lamp with high luminance by temporally stopping the lamp dimming.

Figure 8:
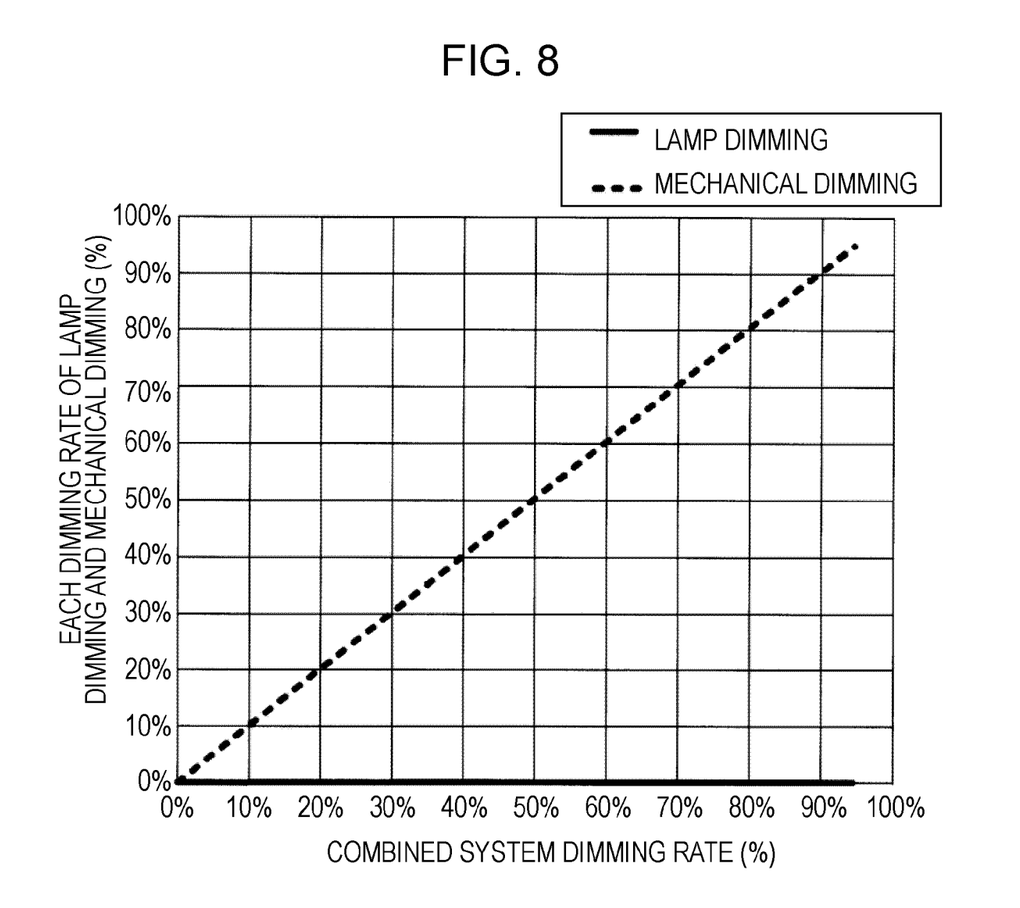
FIG. 8 is a graph which shows a relationship between dimming rates of lamp dimming and mechanical dimming and a system dimming rate of the projector according to a fifth embodiment of the invention.

The control circuit 60 according to the fifth embodiment monitors a temporal change of the first dimming rate of the lamp dimming, and sets the first dimming rate so that the light source 10 emits light with predetermined luminance in a predetermined time in order to suppress the deterioration of the high pressure mercury lamp 11 when the change in time of the first dimming rate satisfies a predetermined condition, and controls the second dimming rate of the mechanical dimming so that a desired system dimming rate can be obtained.

FIG. 8 shows a relationship between the dimming rates of the lamp dimming and the mechanical dimming which are performed in a predetermined period by the control circuit according to the fifth embodiment and the system dimming rate. In the example, the first dimming rate is set to zero so that the light source 10 emits light with the maximum luminance (a predetermined luminance), and it is controlled such that all the system dimming rate is assigned to the second dimming rate. In addition, the control circuit 60 performs the same dimming operation as those of the first to third embodiments, and the fifth embodiment except for the predetermined period.

By performing such a control, it is possible to suppress the deterioration of the high pressure mercury lamp 11, and to obtain a long life of the high pressure mercury lamp 11. In addition, when the mechanical dimming is not included, since it is difficult to control the system dimming rate in a predetermined period, the contrast ratio is lowered, however, according to the fifth embodiment, it is possible to raise the contrast ratio even in a predetermined period. Further, when the predetermined period is set to be short, it is possible to relieve the heat load of the douser 21, to widen flexibility of the use materials thereof, and to simplify the structure. In this case, the common operation period, and the predetermined period in which the deterioration is suppressed may be alternately repeated.

6. Sixth Embodiment

Figure 12:
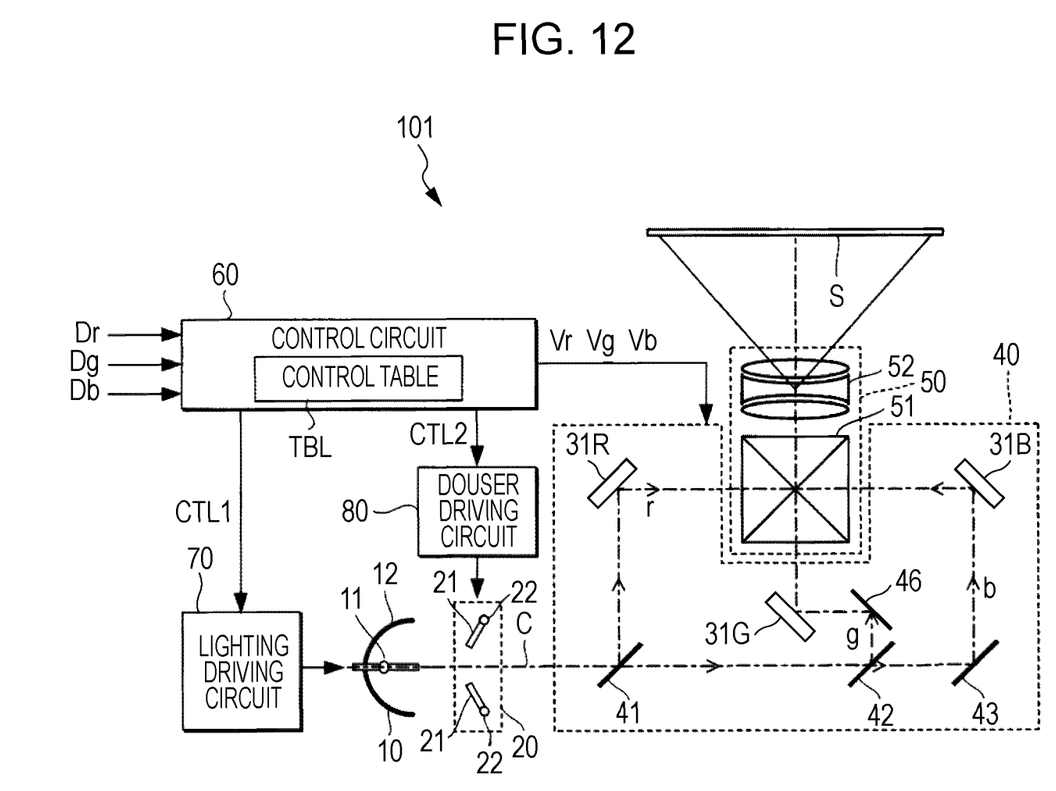
FIG. 12 is a block diagram which shows a projector according to a sixth embodiment of the invention.

Sixth embodiment is an example in which a DLP-type (Digital Light Processing-type) projector 101 is adopted as the projection type display device. An aggregate element of a micro-mirror used in the DLP-type projector is referred to as a DMD (Digital Mirror Device). For this reason, the aggregate element of the micro mirror is referred to as the DMD here. The DMD is a device in which a plurality of minute micro-mirrors is formed in one panel shape. These micro-mirrors are mounted so as to be tilted approximately +/− 10, respectively. One mirror is caused to operate so as to reflect light which is input from the light source lamp in the direction of the projection lens when the mirror is tilted by +10 degree, for example, corresponding to one pixel, and not to reflect the light in the direction of the projection lens when the mirror is tilted by −10 degree. Accordingly, it is possible to configure a projector which is able to obtain a clear image with no color unevenness, since it has a configuration in which the DMD which received a digital signal of a displayed video changes tilting angles of each of the mirrors, and performs on/off of light which is emitted from the light source lamp, and it is possible to control a color gradation in a digital manner of on/off.

The DLP-type projector according to the sixth embodiment includes three DMDs (Digital Mirror Device) 31R, 31G, and 31B which correspond to respective a red color (R color), a green color (G color), and a blue color (B color), instead of the three liquid crystal light valves 30R, 30G, and 30B.

White light which is emitted from a dimming mechanism 20 is input to a dichroic mirror 41, red light r in the white light is reflected, and blue light b and green light g are transmitted. The red light r which is reflected on the dichroic mirror 41 is input to the DMD 31R, is optically modulated by the DMD 31R, and is input to a dichroic prism 51. On the other hand, light which transmits the dichroic mirror 41 is input to dichroic mirror 42, the green light g is reflected on the dichroic mirror 42, is further reflected on a reflecting mirror 46, is input to the DMD 31G, is optically modulated by the DMD 31R, and is input to the dichroic prism 51. On the other hand, the blue light b which transmits the dichroic mirror 42 is reflected on a reflecting mirror 43, is input to the DMD 31B, is optically modulated by the DMD 31B, and is input to the dichroic prism 51.

The control circuit 60 determines the input light amount (equivalent to input light amount which is input to each DMD) which is caused to input to the illumination optical system 40 on the basis of the brightness control signal, and decompresses the input image signals Dr, Dg, and Db in an appropriate gradation range.

The decompressed image signals are converted to analog signals by a DA converter and then are supplied to each DMD 31R, 31G, and 31B as the output image signals Vr, Vg, and Vb. In addition, the control circuit 60 supplies control signals driving the DMDs 31R, 31G, and 31B to the DMDs 31R, 31G, and 31B.

The DLP-type projector according to the sixth embodiment also determines the input light amount which is caused to be input to the illumination optical system 40 on the basis of the brightness control signal similarly to the projector 100 according to the first embodiment shown in FIG. 1, determines the first dimming rate of the light sources 10 and the second dimming rate of the dimming mechanism 20 so as to obtain the input light amount, and controls the light source 10 and the dimming mechanism 20 on the basis of the first and second dimming rates.

The DLP-type projector 101 may be configured by a color wheel, and one DMD.

In addition, in the above described each embodiment, as an example of the lamp 11, the high pressure mercury lamp has been exemplified, however, an extra-high pressure mercury lamp, a metal-halide lamp, a high pressure sodium lamp, a halogen lamp, a high intensity discharge lamp such as a Xenon lamp, or an incandescent bulb (Lev lamp), an LED lamp or the like can be adopted in addition to the high pressure mercury lamp.

What is claimed is:

1. A projection type display device comprising:
a lamp;
a light valve configured to modulate input light from the lamp;
a dimming unit which is provided between the lamp and the light valve and configured to mechanically shield light from the lamp;
a projection unit configured to project light which is modulated by the light valve;
a control unit configured to determine an input light amount which is caused to be input to the light valve on the basis of an input image signal which shows an image to be displayed, output an output image signal which is the decompressed input image signal according to the input light amount to the light valve, and determine a first dimming rate as a dimming rate of the lamp, and a second dimming rate as a dimming rate of the dimming unit based on the input light amount;
a lamp driving unit configured to drive the lamp on the basis of the first dimming rate; and
a dimming driving unit configured to drive the dimming unit on the basis of the second dimming rate,
wherein when the maximum dimming rate in which a halogen cycle in the lamp normally functions is set to a first reference dimming rate and a maximum light amount input to the light valve by setting the first dimming rate and the second dimming rate to zero is set to the maximum light amount, the control unit increases the first dimming rate by setting the second dimming rate to zero until the first dimming rate reaches the first reference dimming rate and increases the second dimming rate after the first dimming rate has reached the first reference dimming rate, as the input light amount is decreased from the maximum light amount.

2. The projection type display device according to claim 1,
wherein the control unit determines so that the first dimming rate is larger than the second dimming rate.

3. A projection type display device comprising:
a lamp;
a light valve configured to modulate input light from the lamp;
a dimming unit which is provided between the lamp and the light valve and configured to mechanically shield light from the lamp;
a projection unit configured to project light which is modulated by the light valve;
a control unit configured to determine an input light amount which is caused to be input to the light valve on the basis of an input image signal which shows an image to be displayed, output an output image signal which is the decompressed input image signal according to the input light amount to the light valve, and determine a first dimming rate as a dimming rate of the lamp, and a second dimming rate as a dimming rate of the dimming unit based on the input light amount;
a lamp driving unit configured to drive the lamp on the basis of the first dimming rate; and
a dimming driving unit configured to drive the dimming unit on the basis of the second dimming rate,
wherein when an adjustable maximum dimming rate in the lamp is set to a maximum dimming rate and a maximum light amount which is input to the light valve is set to a maximum light amount by setting the first and second dimming rates to zero, the control unit increases the first dimming rate by setting the second dimming rate to zero until the first dimming rate reaches the maximum dimming rate and increases the second dimming rate after the first dimming rate has reached the maximum dimming rate, as the input light amount is decreased from the maximum light amount.

4. A projection type display device comprising:
a lamp;
a light valve configured to modulate input light from the lamp;
a dimming unit which is provided between the lamp and the light valve and configured to mechanically shield light from the lamp;
a projection unit configured to project light which is modulated by the light valve;
a control unit configured to determine an input light amount which is caused to be input to the light valve on the basis of an input image signal which shows an image to be displayed, output an output image signal which is the decompressed input image signal according to the input light amount to the light valve, and determine a first dimming rate as a dimming rate of the lamp, and a second dimming rate as a dimming rate of the dimming unit based on the input light amount;
a lamp driving unit configured to drive the lamp on the basis of the first dimming rate; and
a dimming driving unit configured to drive the dimming unit on the basis of the second dimming rate,
wherein the light valve includes liquid crystal panels which correspond to a plurality of colors, respectively, when a dimming rate in which a color shift of an image which is projected when the lamp is gradually dimmed reaches a predetermined reference is set to a second reference dimming rate and a maximum light amount input to the light valve by setting the first dimming rate and the second dimming rate to zero is set to the maximum light amount, the control unit increases the first dimming rate by setting the second dimming rate to zero until the first dimming rate reaches the second reference dimming rate and increases the second dimming rate after the first dimming rate has reached the second reference dimming rate, as the input light amount is decreased from the maximum light amount.

5. The projection type display device according to claim 1,
wherein the control unit sets the first dimming rate so that the lamp is caused to emit light with a predetermined luminance and controls the second dimming rate so as to obtain the input light amount in a predetermined period in which a deterioration of the lamp is suppressed.

6. A method of controlling a projection type display device including, a lamp, a light valve configured to modulate input light from the lamp, a dimming unit which is provided between the lamp and the light valve and configured to mechanically shield light from the lamp, and a projection unit configured to project light which is modulated by the light valve, the method comprising:
determining an input light amount which is caused to be input to the light valve on the basis of an input image signal which shows an image to be displayed;
supplying an output image signal which is a decompressed input image signal according to a determined light amount to the light valve;
determining a first dimming rate as a dimming rate of the lamp and a second dimming rate as a dimming rate of the dimming unit based on the determined input light amount;
driving the lamp on the basis of the first dimming rate; and
driving the dimming unit on the basis of the second dimming rate,
wherein when the maximum dimming rate in which a halogen cycle in the lamp normally functions is set to a first reference dimming rate and a maximum light amount input to the light valve by setting the first dimming rate and the second dimming rate to zero is set to the maximum light amount, the first dimming rate is increased by setting the second dimming rate to zero until the first dimming rate reaches the first reference dimming rate and the second dimming rate is increased after the first dimming rate has reached the first reference dimming rate, as the input light amount is decreased from the maximum light amount.

7. The method of controlling the projection type display device according to claim 6,
wherein the first dimming rate is set so that the lamp is emitted with a predetermined luminance and the second dimming rate is controlled so as to obtain the input light amount in a predetermined period in which a deterioration of the lamp is suppressed.

8. A projection type display device comprising:
a light source;
an optical modulation unit configured to modulate input light from the light source;
a dimming unit which is provided between the light source and the optical modulation unit and configured to mechanically shield light from the light source;
a projection unit configured to project light which is modulated by the optical modulation unit;
a control unit configured to determine an input light amount which is caused to be input to the optical modulation unit on the basis of an input image signal which shows an image to be displayed, supply an output image signal which is a decompressed input image signal according to the input light amount to the optical modulation unit, and determine a first dimming rate as a dimming rate of the light source, and a second dimming rate as a dimming rate of the dimming unit;
a light source driving unit configured to drive the light source on the basis of the first dimming rate; and
a dimming driving unit configured to drive the dimming unit on the basis of the second dimming rate,
wherein when the maximum dimming rate in which a halogen cycle in a lamp as the light source normally functions is set to a first reference dimming rate and a maximum light amount input to the light valve by setting the first dimming rate and the second dimming rate to zero is set to the maximum light amount, the control unit increases the first dimming rate by setting the second dimming rate to zero until the first dimming rate reaches the first reference dimming rate and increases the second dimming rate after the first dimming rate has reached the first reference dimming rate, as the input light amount is decreased from the maximum light amount.

9. The projection type display device according to claim 1,
wherein when the combined system dimming rate is higher than the predetermined rate, the lamp driving unit drives the lamp so as to maintain the first dimming rate into the predetermined rate and the dimming driving unit drives the dimming unit so as to reach the combined system dimming rate by adjusting the second dimming rate.

* * * * *